United States Patent [19]

Grayson et al.

[11] Patent Number: 4,845,511
[45] Date of Patent: Jul. 4, 1989

[54] SPACE DEPLOYABLE DOMED SOLAR CONCENTRATOR WITH FOLDABLE PANELS AND HINGE THEREFOR

[75] Inventors: Fred G. Grayson, West Melbourne; Warren H. Miller; James D. Sturgis, both of Palm Bay, all of Fla.

[73] Assignee: Harris Corp., Melbourne, Fla.

[21] Appl. No.: 7,191

[22] Filed: Jan. 27, 1987

[51] Int. Cl.⁴ ............................................. H01Q 15/20
[52] U.S. Cl. ................................. 343/915; 343/912; 126/438; 350/613; 16/225
[58] Field of Search ............... 343/915, 912, 916, 840, 343/DIG. 2, 878, 880, 881; 126/438; 350/613, 631; 52/578; 823, 633, 646, 648; 16/223, 385, DIG. 13

[56] References Cited

U.S. PATENT DOCUMENTS

| | | | |
|---|---|---|---|
| 3,372,396 | 3/1968 | Braccini | 343/916 |
| 3,509,576 | 4/1970 | McLain | 343/915 |
| 3,574,306 | 4/1971 | Alden | 16/DIG. 13 |
| 3,576,566 | 4/1971 | Cover et al. | 343/915 |
| 3,616,487 | 11/1971 | Dearth | 416/225 |
| 3,717,879 | 2/1973 | Ganssle | 343/915 |
| 4,231,135 | 11/1980 | Fradin | 16/225 |
| 4,612,550 | 9/1986 | Brucker et al. | 343/915 |
| 4,642,652 | 2/1987 | Herbig et al. | 343/915 |

FOREIGN PATENT DOCUMENTS

| | | | |
|---|---|---|---|
| 1197808 | 8/1978 | Switzerland | 16/225 |
| 495735 | 12/1975 | U.S.S.R. | 343/915 |
| 502431 | 4/1976 | U.S.S.R. | 343/DIG. 2 |

Primary Examiner—William L. Sikes
Assistant Examiner—Michael C. Wimer
Attorney, Agent, or Firm—Antonelli, Terry & Wands

[57] ABSTRACT

A space deployable solar energy concentrator is formed of a dome-shaped arrangement of compactly stowable flat panel segments mounted on a collapsible, space-deployable support structure of interconnected linear components. The support structure is comprised of a plurality of tensioned, curvilinear edge strips which extend in a radial direction from a prescribed vertex of a surrounding umbrella-like framework of radially extending rib members. Between a respective pair of radially-extending, curvilinear edge strips an individual wedge-shaped panel section is formed of a plurality of multi-segment lens panel strips each of which is supported in tension between the pair of edge strips by a pair of circumferentially extending catenary cord members connected to a pair of ribs of the surrounding umbrella-like framework. A respective lens panel strip is comprised of a plurality of flat, generally rectangular-shaped, energy-directing panels arranged side-by-side in the circumferential direction of the dome. Adjacent panels are interconnected by flexible U-shaped hinges which overlap opposing edges of adjacent panels and engage respective cylindrically-shaped, load distribution bars that slide within the flexible hinges. Because each U-shaped hinge is flexible, it is permitted to shift in the circumferential direction of the panel section to facilitate stowage and deployment of the dome.

38 Claims, 17 Drawing Sheets

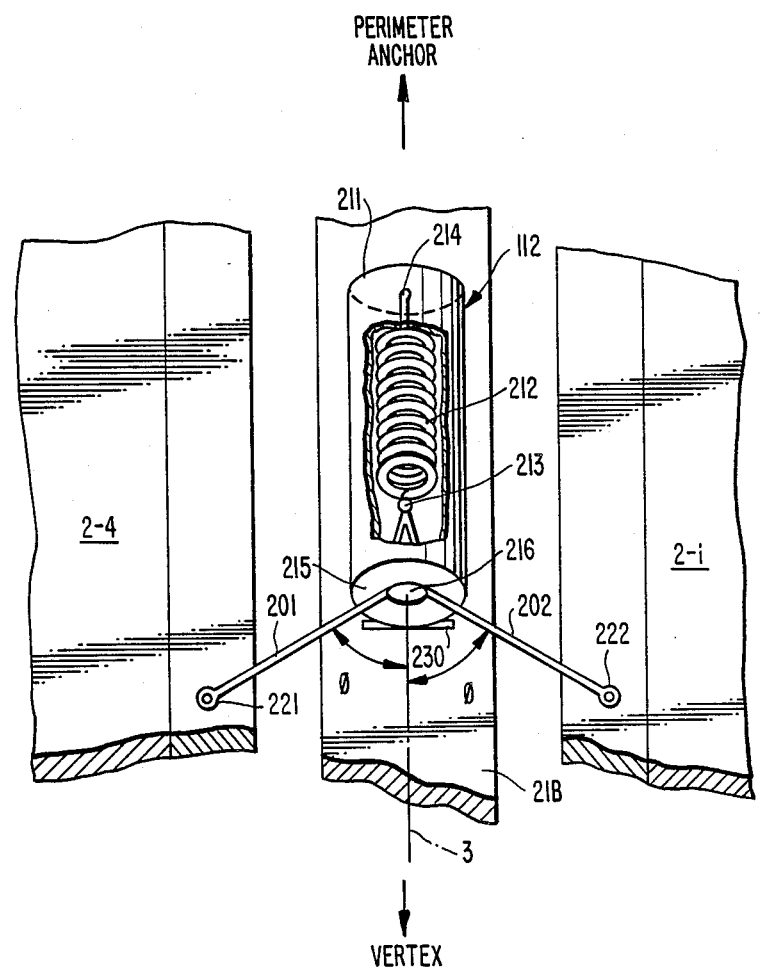

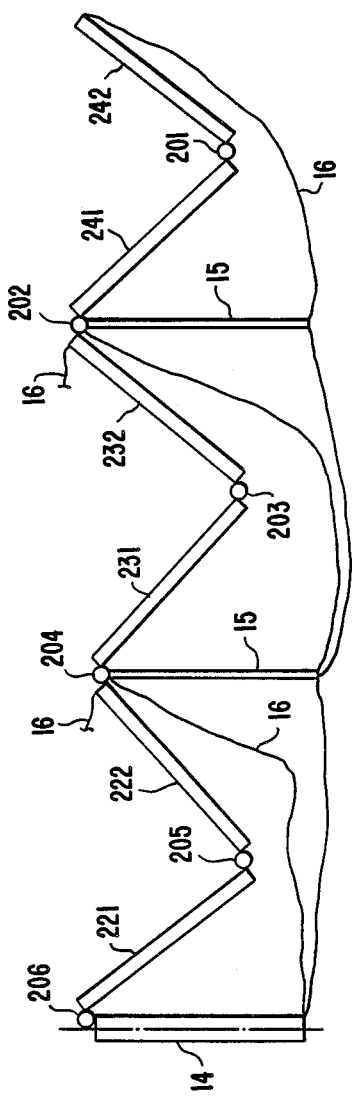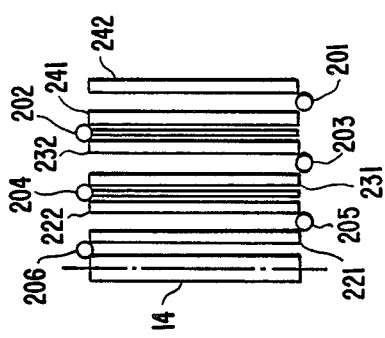

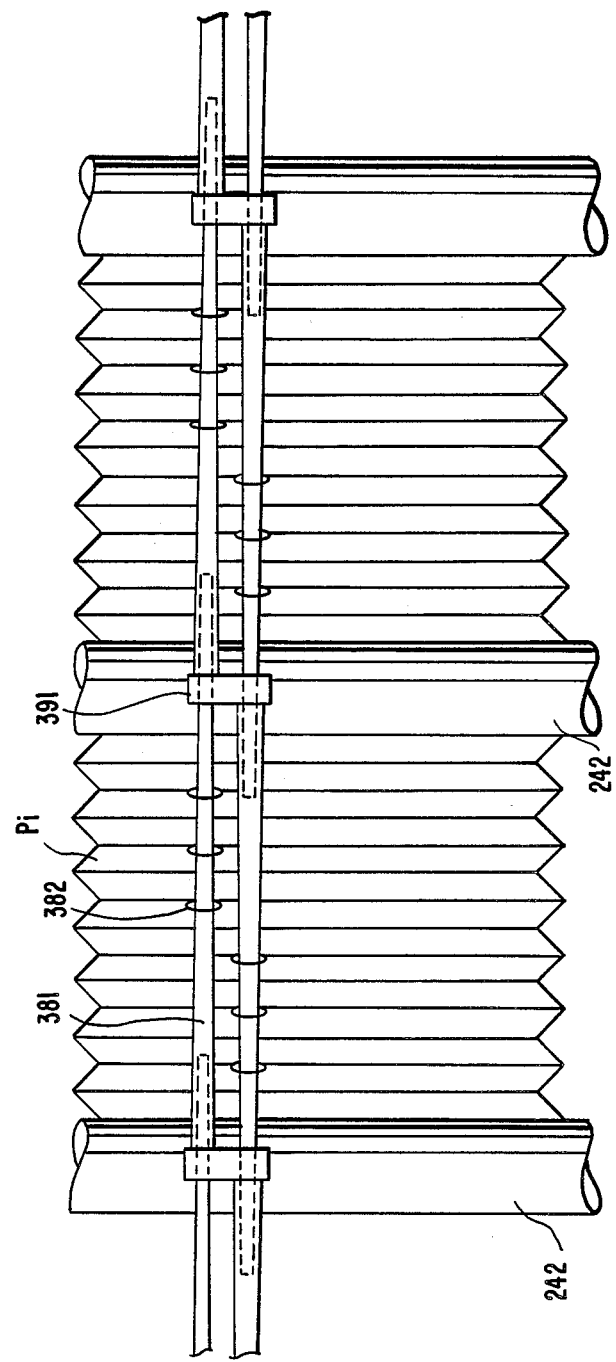

SPACE DEPLOYABLE DOMED SOLAR CONCENTRATOR WITH FOLDABLE PANELS AND HINGE THEREFOR

The invention described herein was made with Government support in the performance of word under NASA Contract No. NAS 3-24570 and is subject to the provisions of Section 305 of the National Aeronautics and Space Act of 1958 (72 Stat. 435; 42 U.S.C. 2457), and the Government has certain rights in the invention.

FIELD OF THE INVENTION

The present invention relates in general to energy directing apparatus and is particularly directed to a space deployable structure for supporting a plurality of solar energy lens panels in a domed configuration.

BACKGROUND OF THE INVENTION

With the availability of a practical extraterrestral payload delivery system, science and engineering research facilities have accelerated their efforts to design and construct large-scale orbital structures (e.g. a space station), where advantage can be taken of both weightlessness and absence of the electromagnetic absorbtion and reflection characteristics of the earth's atmosphere. Among the various types of assemblies to be deployed on such structures are large surface area electromagnetic energy (e.g. solar energy) directing mechanisms (e.g. focussing reflective or refractive assemblies).

A typical electromagnetic energy concentrator assembly incorporates a three-dimensional, compound-curved structure shaped to conform to a paraboloid of revolution. Because of its compound (e.g. double) curve configuration as well as its large size (e.g. 15 meter diameter, 5 meter depth), the construction, packaging (launch vehicle stowability) and successful deployment of such a structure is considered to be a costly and complex engineering exercise. On the one hand the manufacture of compound curved reflector or lens elements involves complex tooling components and consequential high fabrication costs. In addition, the interconnection of radial and cord members of the support framework typically requires tensioning of structural components in both radial and circumferential directions, thereby necessitating the use of stress members on both sides of the energy directing surface in order to obtain contour equilibrium.

SUMMARY OF THE INVENTION

In accordance with the present invention the shortcomings of conventional compound curved energy directing mechanisms are obviated by an improved electromagnetic energy (e.g. solar energy) concentrator through which compound curvature (e.g. doubly curved) surfaces are approximated by a three-dimensional dome-shaped arrangement of compactly stowable flat panel segments mounted on a collapsible, space-deployable support structure of interconnected linear components. The support structure is comprised of a plurality of tensioned, curvilinear edge strips which extend in a radial direction from a prescribed apex of a surrounding umbrella-like framework of radially extending rib members. Between a respective pair of radially-extending, curvilinear edge strips an individual wedge-shaped panel section (or gore) is formed of a plurality of multi-segment (lens) panel strips each of which is supported in tension between the pair of edge strips by a pair of circumferentially extending catenary cord members connected to a pair of ribs of the surrounding umbrella-like framework.

A respective lens panel strip is comprised of a plurality of flat, generally rectangular-shaped, energy-directing (e.g. optically transparent) panels arranged side-by-side in the circumferential direction of the dome. Adjacent panels are interconnected by flexible U-shaped hinges which overlap opposing edges of adjacent panels and engage respective cylindrically-shaped, load distribution bars that slide within the flexible hinges. Because each U-shaped hinge is flexible, it is permitted to shift in the circumferential direction of the panel section to facilitate stowage and ease of deployment of the dome. The ability of the load distribution bars to slide in the hinges in the radial direction accommodates changes in surface boundaries with changes in temperature.

Opposite ends of each cylindrically shaped, load distribution bar are connected to a respective pair of circumferentially extending tensioning rear cord members which are attached to a respective pair of rib members of the umbrella-like framework. These tensioning rear cord members coact with tensioning elements that connect opposite sides of a respective panel strip to the pair of radially extending leg members of the panel gore. Each radially extending pair of leg members of a panel gore is also connected, via restraining tie members, to a respective pair of rib members of the support framework.

Because of the generally conical geometry of adjacent panel gores and their connection via tensioning elements to a common edge strip therebetween, the direction of the tensile force acting on adjacent sides of panel strips of adjacent panel gores has a resulting component acting in the radial direction of the dome along that common edge strip. Consequentially, that edge strip is placed in tension in the radial direction, or along the longitudinal direction of the edge strip. This radially directed tensile force in combination with the restraining tie members that connect the edge strip to a respective rib member of the support framework cause the edge strip to take on a curvilinear shape with radial direction of the dome. Namely, the distribution of restraining tie members between radially extending rib and edge strips effectively secures each curvilinearly tensioned edge strip to a rib member and causes each edge strip to generally follow a radial line of the dome.

By virtue of the connections of the respective panel strips (via the tensioning elements and rear cord members) the slope of each respective panel strip will differ in the radial direction of a gore. In the circumferential direction of the dome, the radius of corresponding panel strips of adjacent panels sections around the dome is approximated by the tensioned flat panel segments. As a consequence there is provided a segmented linear approximation of a compound curvature (doubly curved) surface of the intended dome structure.

Within a panel strip, each panel has a narrow line region of reduced cross-section to permit the panel to be foldable on itself about that line in the collapsed, stowed state of the concentrator. In addition, the U-shaped hinges that join adjacent panels and engage a cylindrical load distribution bar are sized to accommodate the folding over of and retention of a pair of adjacent panels in the stowed state.

BRIEF DESCRIPTION OF THE DRAWINGS

FIG. 4A is a detailed illustration of the interconnection of an edge strip tensioning element to panel strips of adjacent panel gores making up the dome-shaped energy directing surface of FIG. 1;

FIGS. 18 and 19 show the rib-truss support structure of FIG. 11 in its partially deployed and stowed conditions;

FIG. 21 diagrammatically shows the manner in which stowage skewers are arranged with the lens panels for facilitating the folded stowage thereof.

DETAILED DESCRIPTION

Figure 1:
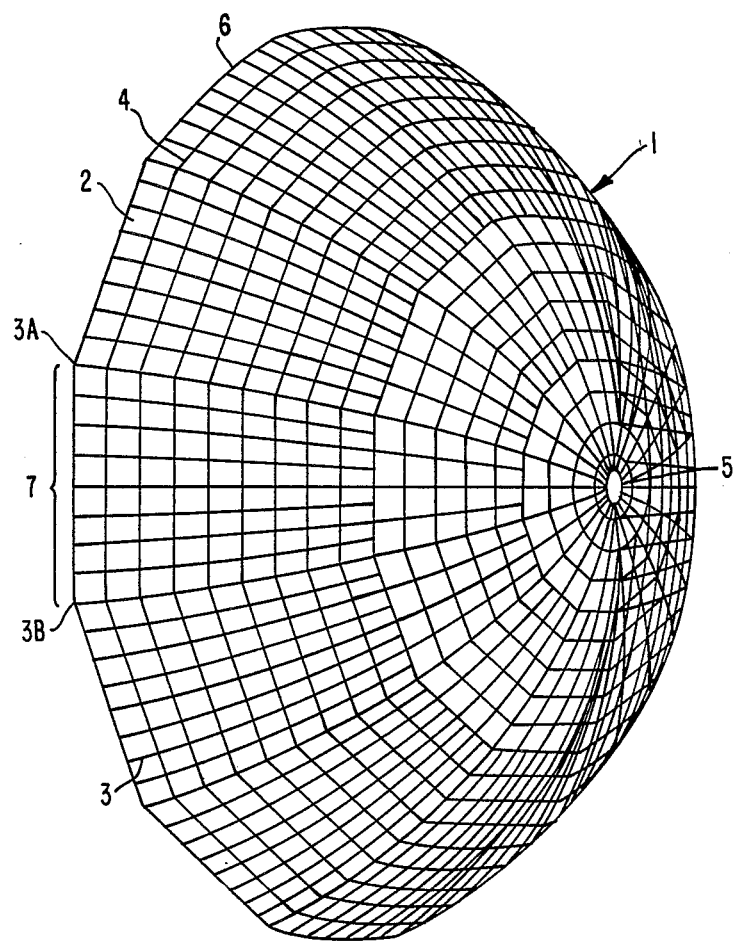
FIG. 1 is a diagrammatic illustration of a dome-shaped energy directing surface.

Referring now to FIG. 1, there is shown a diagrammatic illustration of a domed configuration of a plurality of electromagnetic energy (e.g. solar energy) directing panels interconnected and supported to form an approximation of a stowable compound curved structure. As pointed out previously, pursuant to a preferred embodiment of the present invention, the dome is employed as a solar concentrator for use on a space deployed support structure, e.g. space station. In the configuration shown in FIG. 1, an electromagnetic energy (e.g. solar energy) directing dome 1 is illustrated as being comprised of a plurality of individual energy directing optical lens panels 2 arranged along a plurality of radial lines 3 and a plurality of chord lines 4 which extend in a direction transverse to the radial lines 3 and form successive tiers or chords of circumferential perimeter lines which, together with the radial lines 3, define a compound curved surface of the solar concentrator dome 1. The individual radial lines 3, extend from dome vertex 5 to a circumferential perimeter edge 6 which defines the outermost chord line of the dome.

As shown by the configuration illustrated in FIG. 1, not all of the radial lines 3 extend to the vertex 5 of the dome 1. Certain ones of the radial lines, such as radial line 3A and radial line 3B, extend between the vertex 5 and the circumferential perimeter edge 6. Other radial lines between radial lines 3A and 3B extend from the circumferential edge 6 to prescribed ones of the chord lines 4, as shown. As will be described below in conjunction with FIGS. 2, 3 and 4, those radial lines which extend from the circumferential perimeter edge 6 to the vertex 5 form a boundary of a panel gore that is attachable to a support framework. In the illustration shown in FIG. 1, a panel section or gore 7 is shown as extending between and defined by circumferential perimeter edge 6, vertex 5 and the radial lines 3A and 3B. As will be explained in detail below, each panel gore is configured of a plurality of panel strips comprised of flat panels 2 foldable upon themselves and supported in tension at their outer edges along radial lines, such as radial lines 3A and 3B, and by way of chord lines which extend between the radial lines.

Figure 2:
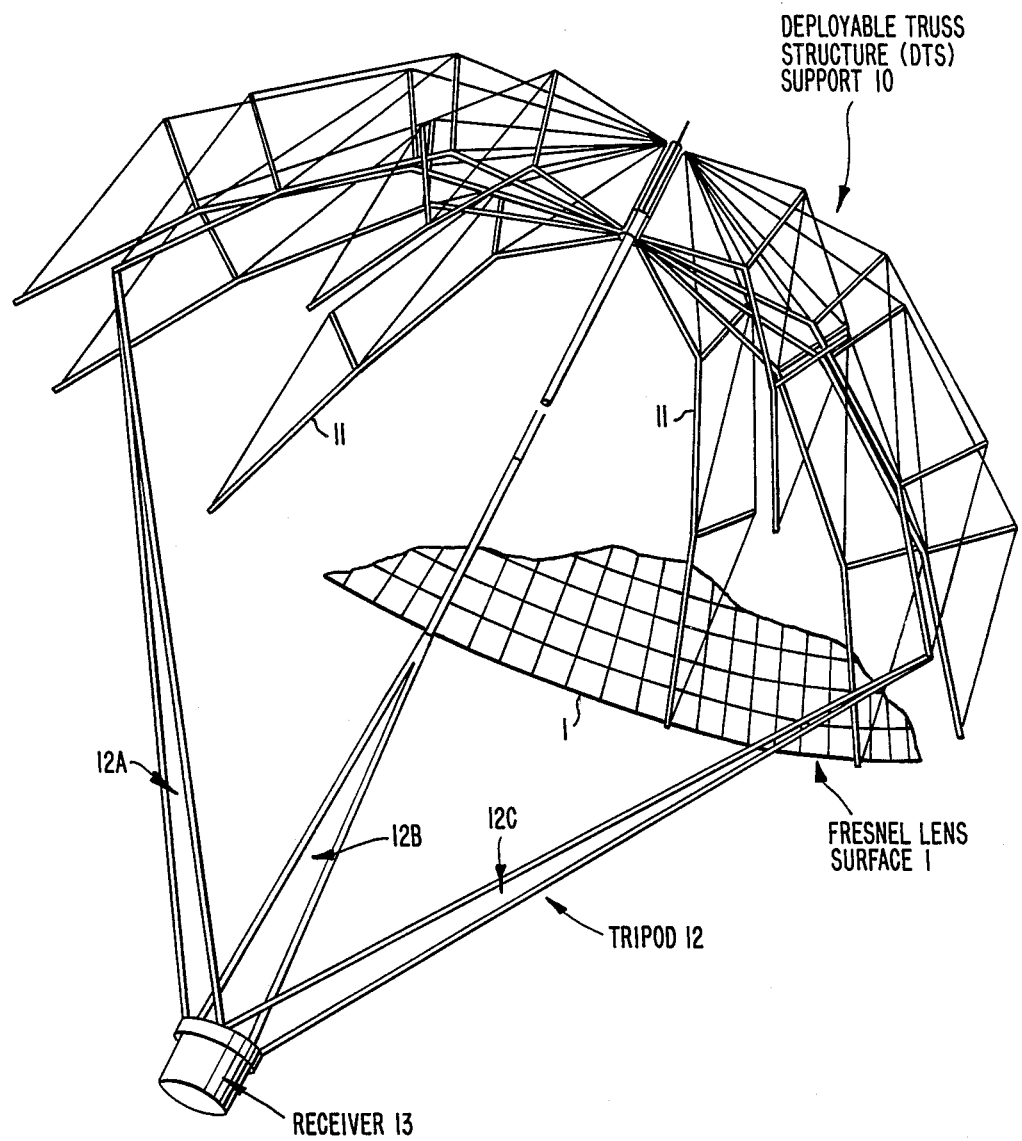
FIG. 2 is a diagrammatic illustration of a space deployable umbrella-like truss framework upon which the dome-shaped energy directing surface of FIG. 1 is supportable.

Referring now to FIG. 2, there is shown one configuration of a collapsible support structure 10 upon which the domed configuration shown in FIG. 1 may be supported.

Preferably, the support structure 10 comprises a foldable, deployable truss structure to be described below with reference to FIGS. 10-21, having a plurality of segmented foldable ribs 11 which are supported by and deploy radially away from a hub 14. As will be discussed in detail below, ribs 11 of the umbrella-like framework are joined with an interconnected arrangement of struts 15 and truss cords 16 to form a truss support structure. In the deployed state shown in FIG. 2, truss-configured, umbrella-like framework 10 is supported at the outer extremities of three of the ribs 11 which are connected to the ends of respective tripod leg pair sections 12A, 12B, and 12C of a tripod 12. Tripod sections 12A, 12B, and 12C extend from a vertex 13, whereat an electromagnetic energy (solar energy) receiver is disposed coaxial with hub 14. With each of the tripod leg pair sections 12A, 12B and 12C being connected to the end of a selected radial rib 11, the deployable truss framework 10 supports the dome concentrator structure 1 (shown as a partially broken-away structure in FIG. 2 for purposes of simplifying the drawing and showing the overall structure of the support truss framework) in spaced apart relationship with the solar energy receiver at vertex 13, so that the solar energy receiver is located at the effective focal point of dome concentrator structure 1.

Figure 3:
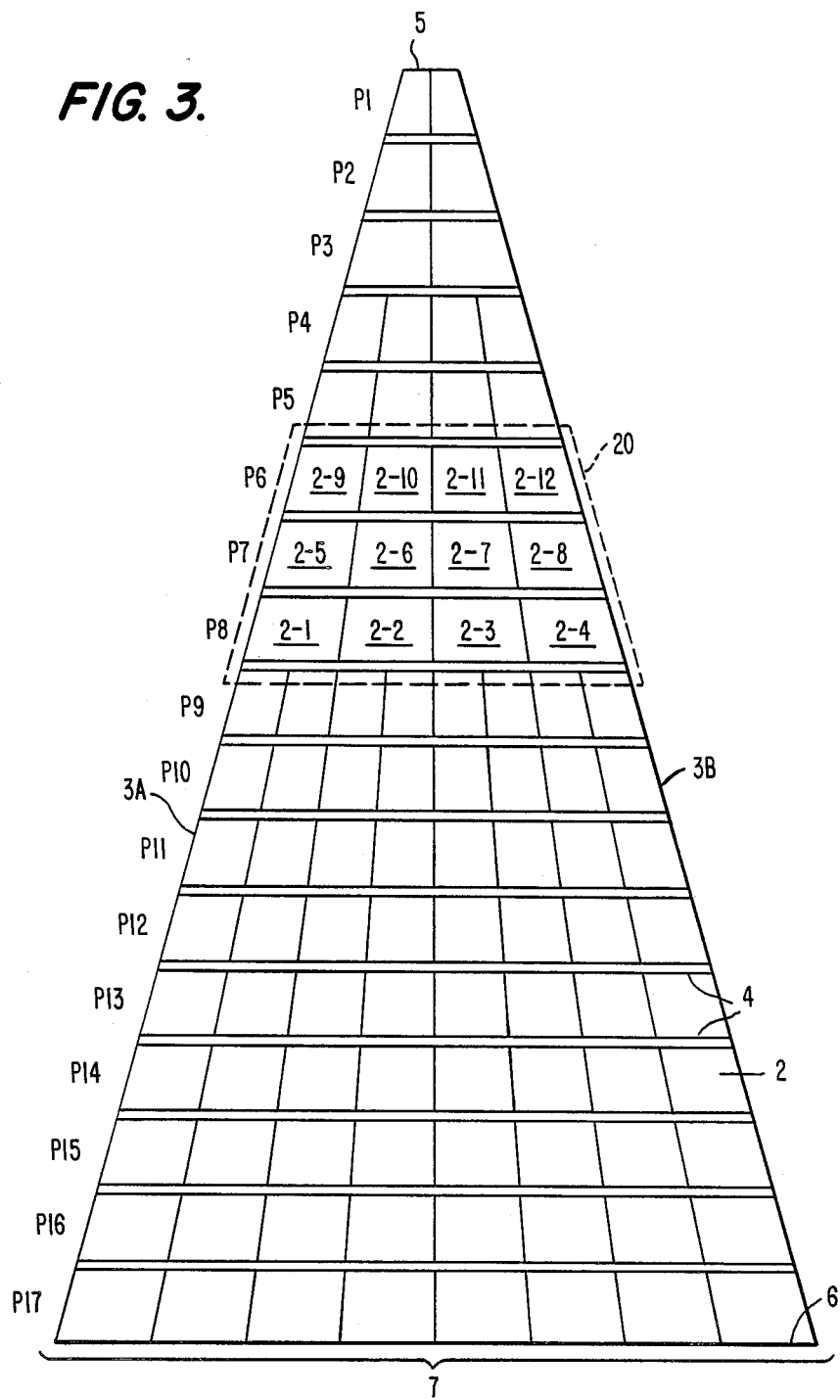
FIG. 3 is a diagrammatic illustration of an individual panel gore of the dome-shaped surface of FIG. 1.

Referring now to FIG. 3, there is shown a general architectural arrangement of a plurality of panels 2 that make up an individual wedge-shaped panel section or gore 7 between a pair of radial lines (such as radial lines 3A and 3B) of the domed configuration shown in FIG. 1. As shown in FIG. 3, an individual panel section or gore 7 is shown as being comprised as a plurality of panel strips P1 . . . P17 extending from the interior vertex 5 to circumferential perimeter edge 6. The outermost panel strip P17 is shown as being comprised of eight adjacentppanels, while the innermost panel section P1 adjacent vertex 5 is shown as being comprised of two panels. It should be observed that the number of panel gores of which the dome is to be configured, the number of panel strips per gore and the number of panels in a respective panel strip are not limited to the numbers presented here; the numbers given are simply for purposes of providing an illustrative embodiment.

A central portion of panel gore 7, demarcated by broken lines 20, comprises panel strips P6, P7 and P8 made up of panels 2-1 . . . 2-12, as shown. Namely, panel strip P8 comprises four panels 2-1 . . . 2-4, panel strip P7 comprises panels 2-5. 2-8.. respectively adjacent to panel segments 2-1 . . . 2-4 of panel strip P8, and panel strip P6 comprises four adjacent panels 2-9 . . . 2-12 respectively adjacent to panels 2-5 . . . 2-8 of panel strip P7.

Figure 4:
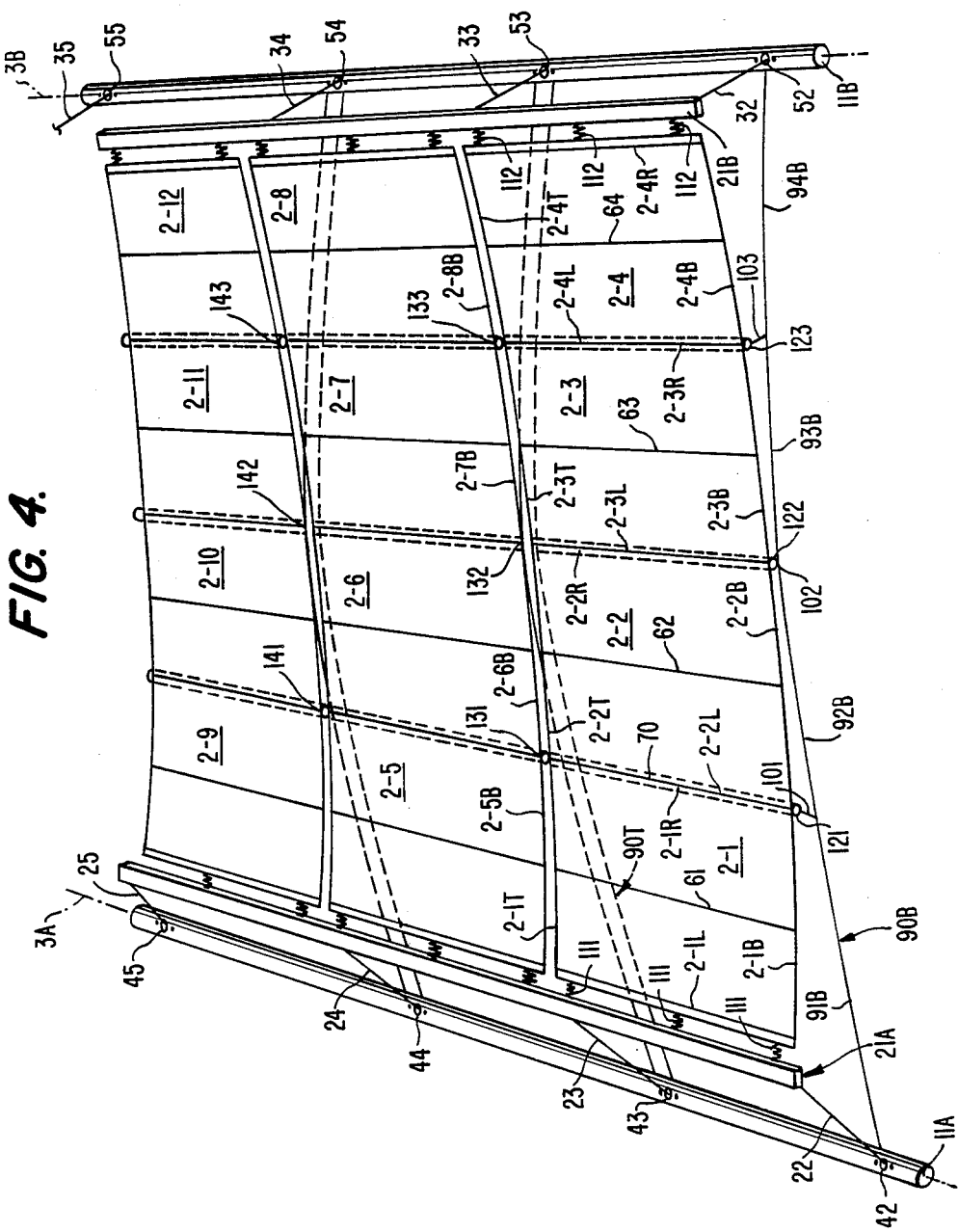
FIG. 4 is a perspective illustration of a portion of an individual panel gore denoted at 20 in FIG. 3.

The manner in which the individual panels are interconnected with one another and connected to the support structure according to the present invention is illustrated in greater detail in FIG. 4. In particular, FIG. 4 shows that portion of FIG. 3 surrounded by broken lines 20 and including portions of the radial rib structure of the support truss 10 shown in FIG. 2. As shown in FIG. 4, panels 2-1 . . . 2-12 extend between a pair of longitudinally extending edge strips 21A and 21B. Each longitudinally extending edge strip 21A is comprised of a plurality of cord-tied segments of material such as an epoxy graphite rod material placed in tension to form an interconnected segmented edge strip structure that is spaced apart from and extends substantially in parallel with a radially extending rib 11A of truss support structure 10. The cord ties connect leg segments at separations aligned with the separations between adjacent panel strips, so as to permit folding of the edge strip segments for storage as will be described below. In a similar manner, edge strip 21B comprises a longitudinal edge strip extending in the radial direction from the apex 5 in parallel with a radial rib 11B. Edge strip 21B is spaced apart from rib 11B, as shown.

Edge strip 21A is connected to connection points 42, 43, 44, 45, . . . of rib 11A by way of a series of distributed tie members (e.g. cable links) 22, 23, 24, 25, as shown, connected at regions of separation between adjacent panel strips P8, P7, P6 . . . Similarly, edge strip 21B is connected by tie members 32, 33, 34, 35 to rib 11B at connection points 52, 53, 54, 55 aligned with the separations between the successively adjacent panels P8, P7, P6 . . .

An individual panel strip, such as panel strip P8, is comprised of adjacent panels 2-1, 2-2, 2-3 and 2-4 which extend between edge strips 21A, 21B, as shown. Each panel has a substantially rectangular-shaped configuration and is preferably made of a flat optically transmissive plastic material, such as polycarbonate, having a thickness on the order of 0.010 in., so as to provide sufficient in-plane mechanical stiffness when the panel segment is supported along a pair of opposite parallel edges. For applications where the dome is employed as a refractive solar concentrator, each panel segment may be formed as a pressed or embossed layer of Fresnel lens material, such as described in U.S. Pat. No. 4,545,366, assigned to Entech Corporation.

In order to support the panel segments of an individual panel strip within a panel gore, each panel is connected at one of its side edges to either a edge strip or to an adjacent panel. Specifically, as shown in FIG. 4, left-most panel 2-1 of panel strip P8 is connected along its left-hand edge 2-1L by way of a plurality of tension members 111 (shown diagrammatically as tension springs) to edge strip 21A. Similarly, right-most panel 2-4 of panel strip P8 is connected along its right-hand edge 2-4R by tension members 112 to leg member 21B.

The right-hand edge 2-1R of panel 2-1 is disposed adjacent and parallel to the left-hand edge 2-2L of panel 2-2. Likewise, the right-hand edge 2-2R of panel 2-2 is disposed adjacent and parallel to the left-hand edge 2-3L of panel 2-3. Similarly, the right-hand edge 2-3R of panel 2-3 is disposed adjacent and parallel to the left-hand edge of 2-4L of rightward-most panel 2-4 as shown in FIG. 4. The top edges 2-1T, 2-2T, 2-3T and 2-4T of respective panels 2-1, 2-2, 2-3 and 2-4, are aligned with one another and are spaced apart from the bottom edges 2-5B, 2-6B, 2-7B and 2-8B of respective panels 2-5, 2-6, 2-7 and 2-8, as shown. Similarly, the bottom edges 2-1B, 2-2B, 2-3B, 2-4B of respective panels 2-1, 2-2, 2-3 and 2-4, are aligned with one another and separated from the top edges of the panels of panel strip P9 (not shown in FIG. 4).

Adjacent panels of a panel strip are interconnected to one another by way of flexible hinges which are attached to the bottom surface of each panel along their respective right and left-hand edges and are coupled to cylindrically shaped load distribution bars schematically shown at 121, 122 and 123 for panels 2-1 . . . 2-4; at 131, 132 and 133 for panels 2-5 . . . 2-8, and 141 . . . 143 for panels 2-9 . . . 2-12, as shown. The configuration of the flexible hinges and the load elements are shown in greater detail in FIGS. 5-9 to be discussed below. For purposes of the description of FIG. 4, suffice to say that the flexible hinges maintain adjacent edges of adjacent panels, such as edge 2-1R of panel 2-1 and edge 2-2L of panel 2-2 in parallel with one another and slightly spaced apart from one another to form a seam 70 (e.g. on the order of one sixty-fourth of an inch spacing) therebetween.

Opposite ends of each of the cylindrical load bars, which engage the respective flexible hinges by way of which the panels are joined (cables) together, are connected to respective tensioning rear cord members that extend between radial ribs 11A and 11B. In particular, a bottom edge cord member 90B extends between connection points 42 and 52 of respective radial ribs 11A and 11B of the deployable truss structure 10 and is joined by way of end fasteners and connection links to a lower end of each of cylindrical loading bars 121, 122 and 123. Cord member 90B is connected at its central portion directly to an end fastener 102 of load bar 122 and by way of tension ties 101 and 103 to load bars 121 and 123, as shown, so as to form within cord member 90B a plurality of rectilinear cord segments 91B, 92B, 93B and 94B as shown. In effect, cord member 90B pulls on each of the cylindrical loading bars 121, 122 and 123, namely it urges them in a direction away from the panels 2-1 . . . 2-4 and toward radial ribs 11A and 11B, so as to place each of the panels in tension between edge strips 21A and 21B.

Similarly, adjacent to the top edges 2-1T . . . 2-4T of respective panels 2-1 . . . 2-4 is a top edge cord member 90T which is connected to upper ends of cylindrical load bars 121, 122 and 123 and to radial ribs 11A and 11B at connection points 43 and 53, respectively, as shown. Top edge cord member 90T functions together with bottom edge cord 90B to maintain the panel segments 2-1 . . . 2-4 panel strip P8 in tension between edge strips 21A and 21B. Because each panel strip has its own pair of top edge and bottom edge-coupled cord members, the panel strip can be adjusted independent of other panel strips, thereby minimizing interaction between panel strips and gores. As a result equilibration of the dome surface contour is considerably simplified.

The load bars, which engage the hinges that join the panels together, serve to distribute loads induced by the cord members and tensioning ties equally across each panel, thereby maintaining their individual effectively flat or planar surfaced shapes. In effect each panel strip must be tensioned only in the circumferential directions (rib-to-rib), due to the sufficient in-plane stiffness of each panel which prevents the formation of wrinkles in the dome surface.

As will be explained below in conjunction with the description of FIG. 4A, each of the edge strips is placed in tension by anchoring each edge strip to a respective rib member at the circumferential perimeter edge 6 of the dome 1 and by the action of tensioning fasteners 111 and 112 between the sides of the panel strips and edge strips of adjacent panel sections or gores 7, so that each edge strip 21A and 21B is urged away from longitudinally extending radial ribs 11A and 11B of the support truss framework. As a result, tie members 22 . . . 25 and 32 . . . 35 are placed in tension and maintain the respective edge strips properly spaced apart from and aligned with radial ribs 11A and 11B.

As noted above, rear cord members 90B and 90T and their associated ties to the load distribution bars 121, 122 and 123 place each of the panels in tension between edge strips 21A and 21B and the ribs, via the cord members themselves. Each individual panel has sufficient in-plane stiffness so as to maintain its shape when supported along its opposite edges, (e.g. whereat load bars 121, 122, 123 are supported by hinges). As a result, the placing of the individual panels of a panel strip, such as panel strip P8 between edge strips 21A and 21B, creates a segmented approximation of a curve along a circumferential line of the intended dome configuration. Because each edge strip 21A and 21B is curved in a radial direction of the intended dome shape, the slope of each gore will change along the radial direction from one panel strip to the next. Consequently, the segmented panel configuration of the present invention effectively approximates a compound curve corresponding to a dome shape, as shown in FIG. 1.

Referring now to FIG. 4A, there is illustrated a portion of a edge strip (edge strip) 21B, panel 2-4 and an adjacent panel 2-i of an adjacent panel gore (not shown in detail). Also shown in FIG. 4A is the detailed configuration of an individual one of the tensioning fasteners 112 by way of which opposite edges of panel strips of adjacent panel sections are connected to the leg member (21B). As shown in FIG. 4A, each tension fastener 112 preferably comprises a hollow cylindrical tube 211 containing a tension spring 212 attached at one end 214 thereof to one end of the hollow tube 211 and at the other end 213 thereof to a pair of flexible connecting links (e.g. cables) 201 and 202, which extend to connection points 221 and 222, respectively, on panels 2-4 and 2-i, as shown. Each of connection links 201 and 202 extends through an aperture 216 of a low friction (e.g. Teflon-surfaced) end 215 of tube 211. Tube 211 is attached (e.g. adhesively affixed) along edge 230 to edge strip 21B.

Each of connecting links 201 and 202, which connects a respective panel strip to edge strip 21B, forms an acute angle $\phi$ with the radial direction (denoted by radial line 3) in which edge strip 21B extends. (As an example, for a dome comprised of twelve panel sections or gores, the angle between adjacent radial lines would be $(360°/12)$ or $30°$. Consequently, each acute angle $\phi$ would be $(180° - 30°)/2$ or $75°$). Because of this acute angle $\phi$ and with each panel strip being similarly connected to a pair of edge strips around the circumference of the dome, and with the edge strips being anchored at the outer perimeter of the support structure, each edge strip will be placed in tension in the radial direction by the tensile forces acting through connecting links 201 and 202, namely by a resultant tensile component acting along the radial direction. It is this resultant tensile force in the radial direction created by tensioned and connecting links 201 and 202 which urges edge strip 21B away from radial rib 11B (FIG. 4). The distribution of ties 32, 33, 34, 35, . . . between edge strip 21B and rib 11B effectively curvilinarly shapes edge strip 21B along the curved radial lines 3 of the dome shape shown in FIG. 1. Consequently, the radially curved shape of the dome structure is obtained by the tensioning of the edge strips resulting from the tensile force created by the tension spring fasteners distributed therealong and the interaction of the panel strips connection links and edge strips. The second portion of the compound curve is created by the tensile force through which the pairs of dual rear cords (e.g. 90B, 90T) act on the load distribution bars of the flexible hinges through which adjacent panels of an individual panel strip or gore are interconnected.

Figure 5:
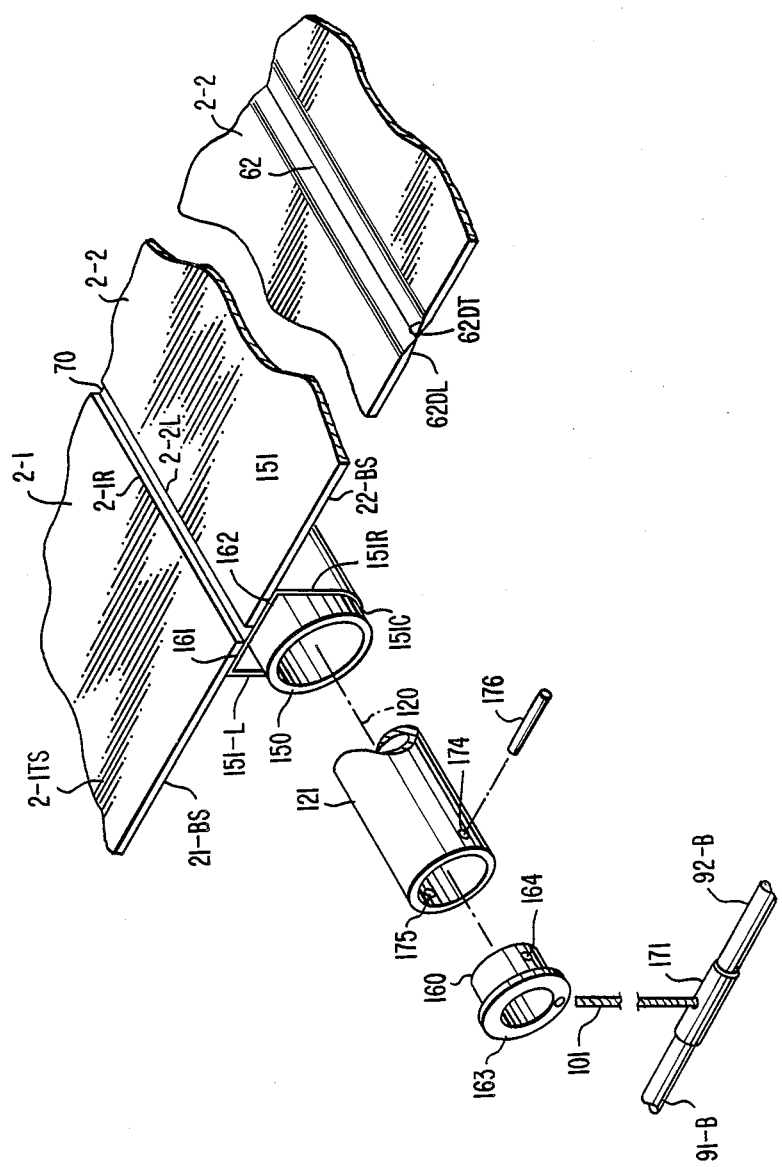
FIG. 5 is a detailed perspective illustration of the components of a flexible hinge assembly and cylindrical load distribution bar.

Referring now to FIG. 5, an individual hinge assembly for engaging a cylindrical loading bar for a pair of adjacent panels and the manner of connecting the loading bar to the rear cords are shown in detail. More particularly, FIG. 5 shows a partially broken away illustration of panels 2-1 and 2-2 of panel strip P8 shown diagrammatically in FIG. 4, described supra. As illustrated in FIG. 5, right-hand edge 2-1R of panel 2-1 is spaced apart from left-hand edge 2-2L of panel 2-2 to form a seam 70 therebetween. A substantially U-shaped hinge 151, preferably comprised of a plastic material, such as polycarbonate, is adhesively affixed at segments 161 and 162 to the lower surface 21-BS of panel 2-1 and lower surface 22-BS of panel 2-2, as shown. A lower U-shaped portion of hinge 151 comprised of a pair of leg portions 151L and 151R and a curved portion partially surrounds and is affixed to a hollow cylindrical sleeve 150 through which a graphite loading bar 121 slidably extends, so that the loading bar 121 is effectively slideably engaged within the hinge. Loading bar 121 has an axis 120 which extends in parallel with the seam 70. Opposite ends of the loading bar 121 terminate at the bottom and top edges of the panels to which the hinge 151 is attached.

As shown in FIG. 5, one end of the cylindrical loading bar 121 has a pair of holes 174 and 175 diametrically opposed to one another and aligned with a pair of holes (one of which 164 is shown) of a circular T-shaped end cap 160 which fits within the end of the cylindrical loading bar 121 and is captured thereby by way of a pin 176 which extends through holes 174-164- . . . 175, as shown. An annular T-shaped portion 163 of cap, 160 is attached to a cord tie 101 which engages tube 171, as shown. Cord member 90B passes through tube 171 and is secured to radial ribs 11A and 11b, as described previously in the description of FIG. 4.

Also shown in FIG. 5 is the manner in which each individual flat panel is foldable upon itself. Each panel has a fold line 62 defined by a pair of depressions in the top and bottom surface of the panel. As shown in FIG. 5, panel 2-2 has a concaved depression 62DT in its top surface and a concave depression 62DL in its lower surface to define fold line 62. As will be explained below, the fold line permits the panel to be foldable upon itself and thereby stowable for transport and deployment.

Referring now to FIGS. 6-9, there is illustrated a sequence of steps showing the manner in which the flexible hinge assembly of the invention permits the panel segments to be translatable relative to the support structure and thereby able to accommodate thermal growth and shrinkage in the radial direction without inducing loads into the cord/tie system.

Figure 6:
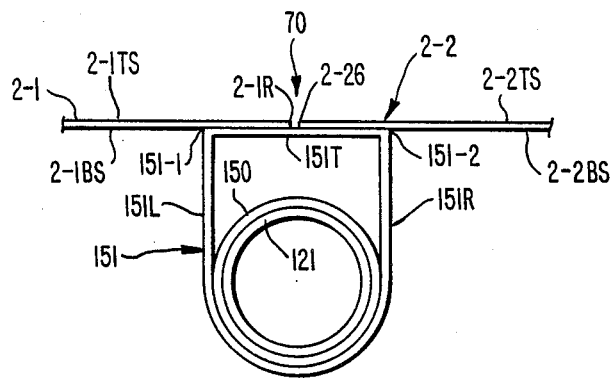
FIGS. 6-9 are diagrammatic illustrations of a flexible hinge assembly sequentially showing the folding of adjacent panels.

As shown in detail in FIG. 6, each flexible hinge assembly has a pair of leg portions 151L and 151R of U-shaped cross-section extending from the lower curved portion 151C and extending to opposite ends 151-1 and 151-2, respectively, of a top portion 151T which is adhesively affixed to the bottom surface 2-1BS and 2-2BS of respective panels 2-1 and 2-2. Because cylindrical load bar 121 slideably engages the interior surface of cylinder 150 within flexible plastic hinge 151, the respective panels to which the load bar is attached by way of the flexible hinge are permitted to shift or translate in response to thermal changes without warping the intended surface of the dome structure. Moreover, the length of each of segments 151L and 151R, namely the parallel side legs of the U-shaped hinge, is chosen so as to permit the flexible hinge/loading bar assembly to be foldable and self-supporting.

Figure 7:
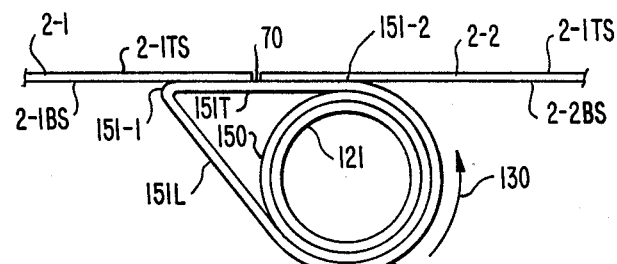
Figure 8:
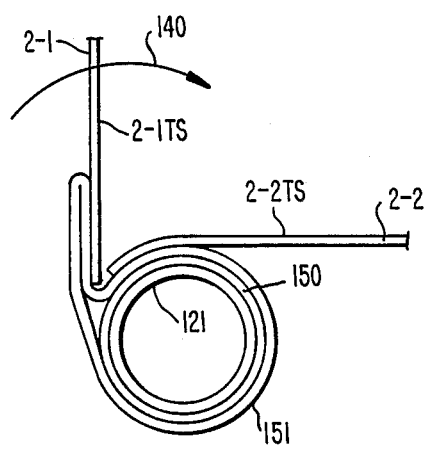
Figure 9:
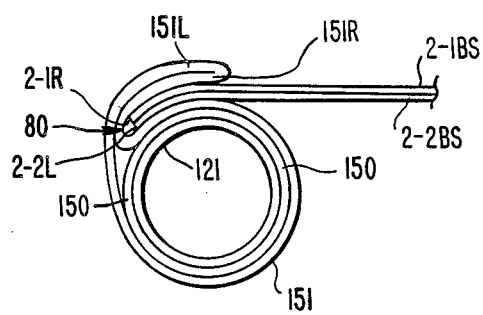

This latter attribute of the flexible hinge assembly is best illustrated in FIGS. 7-9 which show a sequence of translations of the load bar and rotation of the panels. In FIG. 7, there is a displacement of the load bar 121 to the right of the seam 70 and counter-clockwise as shown by arrow 130. Next, as shown in FIG. 8, there is a folding over of panel 2-1 towards panel 2-2, clockwise in the direction of arrow 140. Finally, a mutual surface engagement of the top surfaces 2-1TS, 2-2TS of panels 2-1 and 2-2, respectively, and the folding over of leg portions 151L and 151R of the plastic hinge assembly occur, as shown in FIG. 9.

In its completely folded configuration, where panels 2-1 and 2-2 abut against one another in a face-to-face relationship as shown in FIG. 9, the edge portions 2-1R and 2-2L of the panels are captured and stably retained at fold region 80. Consequently, in its stowed configuration, to be described below, each panel strip tends to remain in a compact, static condition, with the respective panels of a panel strip interleaved with one another. This compact stability feature of the present invention greatly facilitates its transport to an orbital, deployment position.

Figure 10:
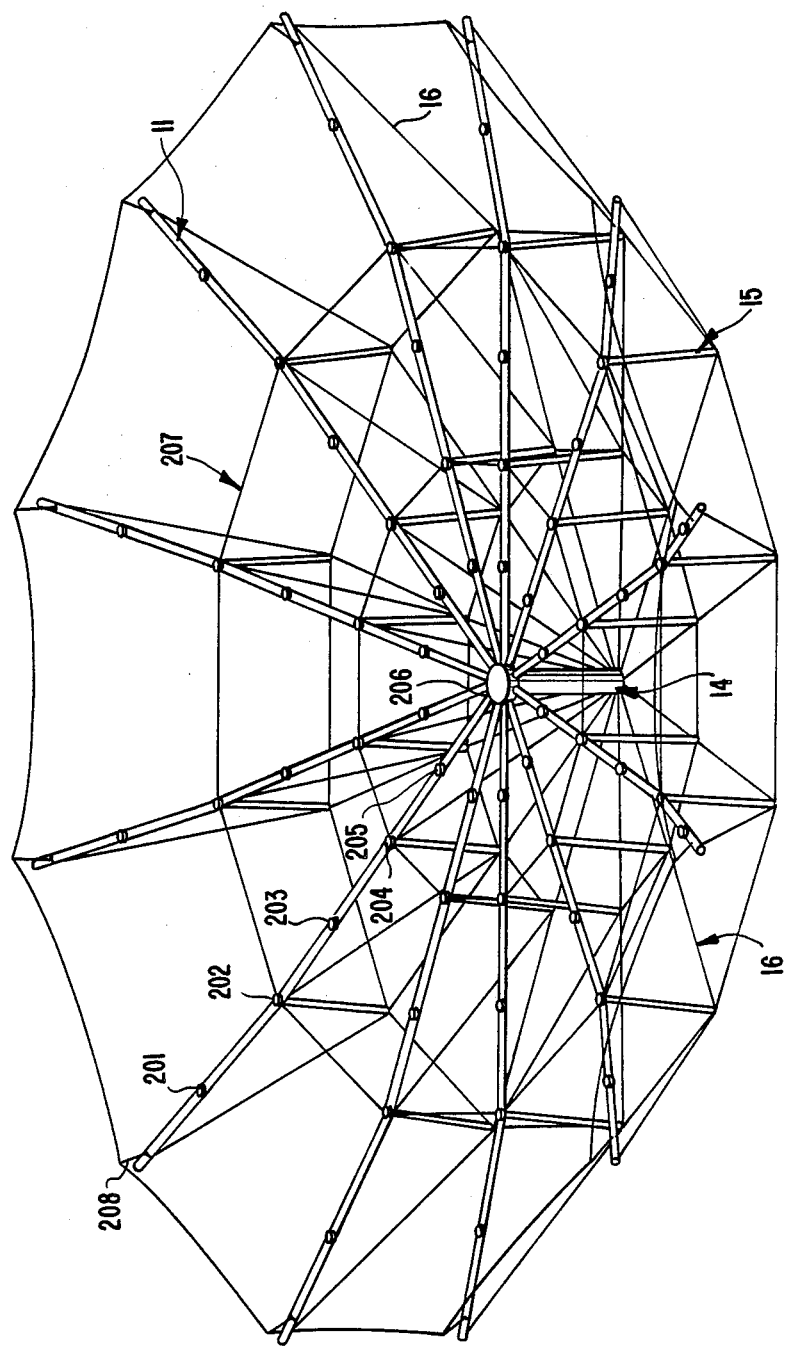
FIG. 10 is a diagrammatic illustration of a deployable truss structure for supporting the energy directing dome of FIG. 1.

Referring now to FIG. 10 there is shown a diagrammatic illustration of the structural configuration of a multiribbed truss framework for supporting the dome solar energy concentrator structure described above. As discussed previously with reference to FIG. 2, the support framework has a plurality of ribs 11 extending radially from a central hub 14 and interconnected with an arrangement of struts 15 and truss cords 16. To permit compact stowage of the support framework and the panel sections of the domed concentrator each of the ribs 11 is formed of a plurality of rib segments which are joined together by a series of interconnecting hinge joints 201, 202, 203, 204, 205. The overall rib is joined to the hub 14 by a hub hinge joint 206. The outer end of each rib 11 has a standoff 208 to which a respective edge strip of the solar concentrator dome structure is anchored, so that each edge strip may be placed in tension in the radial direction by the action of spring fasteners 112 shown in FIG. 4A, described above.

In the fully deployed condition of the support framework shown in FIG. 10 the hinge joints interconnect adjacent rib segments in a stable rigid condition to define a prescribed piecewise curvilinear shape of the rib as it extends away from the central hub 14. Hinge joints also receive and support respective struts 15 opposite ends of which are connected by a plurality of truss cord members 16, so that each rib section is effectively self-supporting by virtue of its truss configuration. To further stabilize and define the intended shape of the support framework a plurality of circumferentially extending hoop cord members 207 and diagonal cord members (not shown) are connected between circumferentially adjacent strut members at the respective opposite ends thereof and between the outer ends of respective outer tensioning standoffs 208 at the outer ends of each rib. Like ribs 11, the struts and cord members are preferably made of a lightweight, high tensile strength epoxy graphite composition material.

Figure 11:
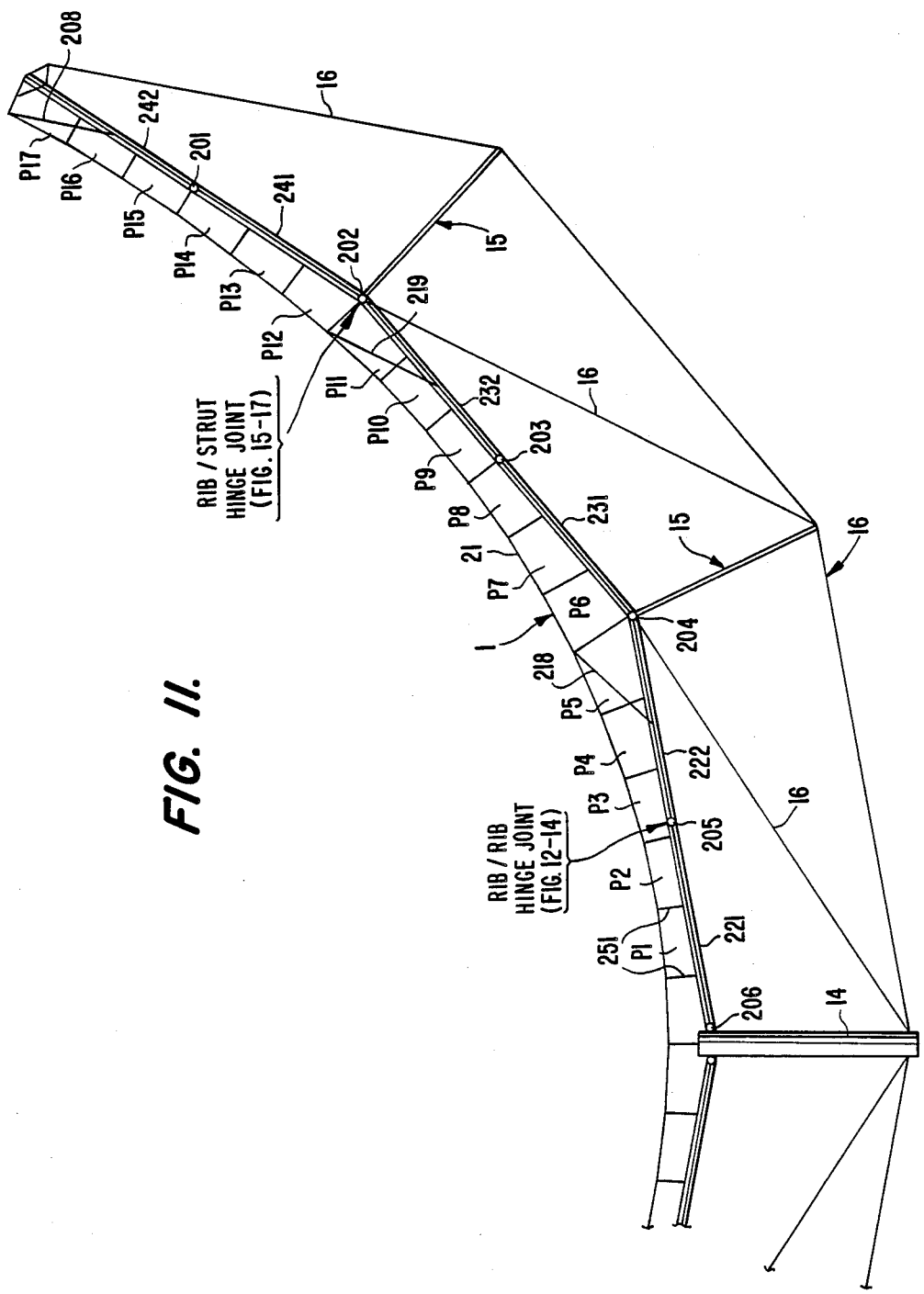
FIG. 11 is a diagrammatic side view of the configuration of an individual rib-truss section of the deployable truss structure shown in FIG. 10.

In FIG. 11 the configuration of an individual rib and its associated panel gore support structure is shown in detail as a serial arrangement of six tubular rib segments 221-222-231-232-241-242 extending from hub 14 to the outer perimeter of the support structure. Rib segment 221 is joined to hub 14 by way of hub hinge joint 206 and to rib segment 222 by rib-to-rib hinge joint 205. Rib-to-strut hinge joint 204 interconnects rib segments 222 and 231 and one of the struts 15, while rib-to-rib hinge joint 203 interconnects rib segments 231 and 232. Hinge joint 202 interconnects rib segments 232 and 241 and another of struts 15. Finally, hinge joint 201 interconnects rib segments 241 and 242. Each of rib segments 222 and 232 may also be provided a respective standoff 218 and 219, similar to tensioning standoff 208 extending from rib segment 242, so as to facilitate the tiedown connecting of the edge strips 21 of the respective panel gores P1-P18 to the ribs 11 by way of a plurality of tie-down cords 251 distributed therebetween, corresponding to tie-down cords 22, 23, 24, 25, . . . , 32, 33, 34, 35, . . . described above with reference FIG. 4.

Figure 12:
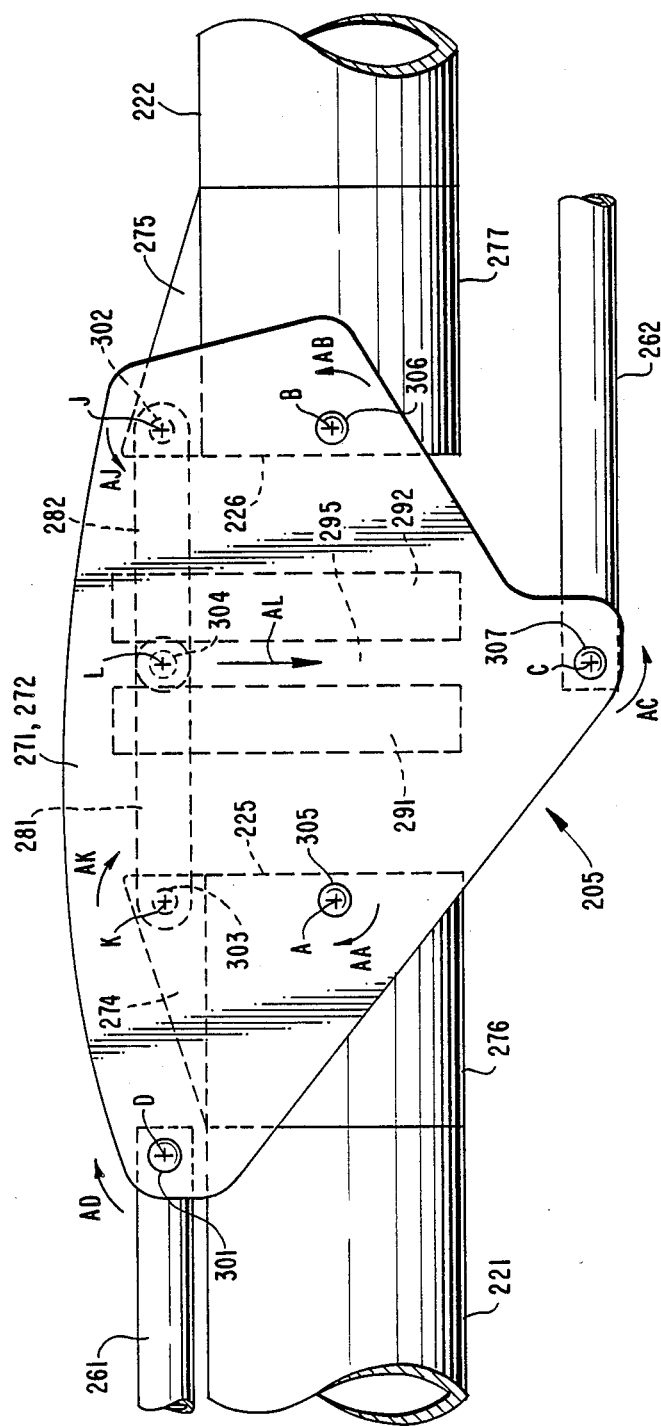
FIGS. 12-14 are respective side, end and top views diagrammatically illustrating the configuration of a rib-to-rib hinge joint of the rib-truss section shown in FIG. 11.
Figure 13:
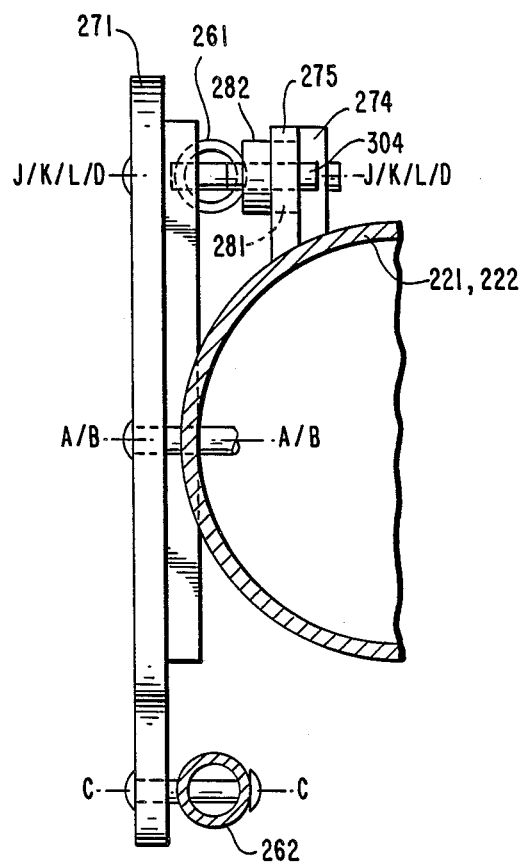
Figure 14:
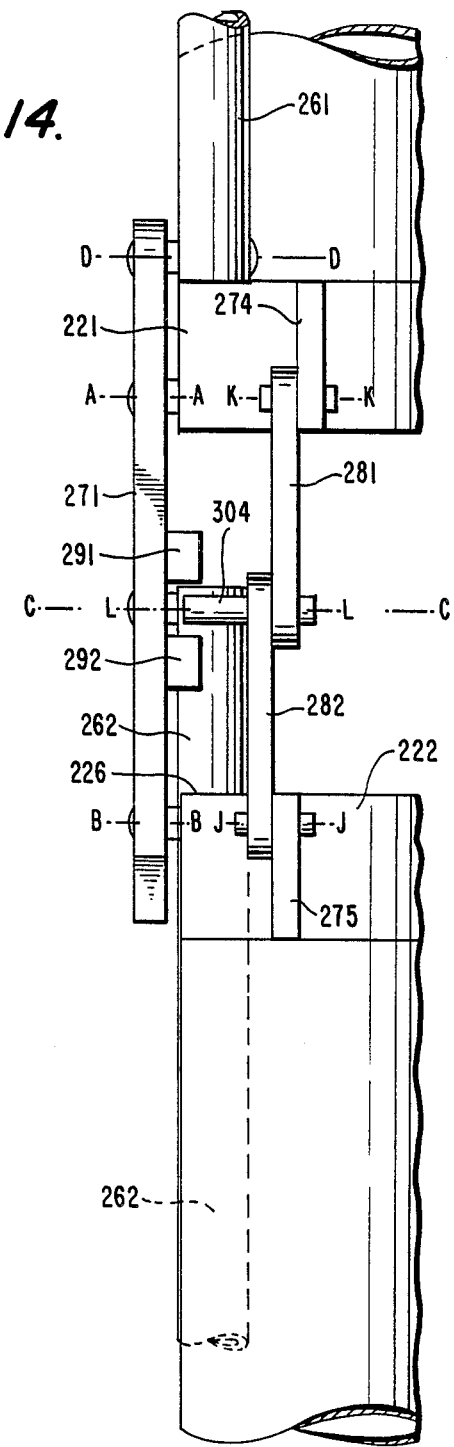

Referring now to FIGS. 12-14 respective side, end and top views of the structural configuration of a respective rib segment-to-rib segment hinge joint (specifically, hinge joint 205 which interconnects tubular rib segments 221 and 222) is shown in detail. Since each hinge joint is formed of a pair of symmetrical halves only half of each joint is shown in order to simplify the drawings. As shown therein each hinge joint is comprised of a pair of spaced apart plates 271, 272, separated by a distance sufficient to accommodate the diameters of tubular rib segments 221 and 222, and a set of connecting links 281 and 282 which extend between respective flanges 274 and 275 of a pair of sleeves 276 and 277 that are fitted on adjacent ends of rib segments 221 and 222. Each of plates 271 and 272 is further provided with a pair of raised land portions 291 and 292 on the interior faces thereof. Land portions 291 and 292 are spaced apart from one another to define guide slot 295 therebetween, in which a pin 304, that extends through axial bores L in each of connecting links, travels during rotation of links 281 and 282 about respective pin connections 303 and 302 rotatably extending through axial bores K and J in the opposite ends of links 281 and 282 and corresponding axial bores K and J in flanges 274 and 275. For purposes of simplifying the drawing, only pin 304 which extends through axial bores L and rides in slot 295 has been shown in detail. The remainder of the pins are identified by reference to axial lines therefor.

Plates 271 and 272 are rotatably connected to tubular rib members by respective pins 305 and 306 extending through axial bores A and B, respectively. A pair of rod members 261 is rotatably coupled to pates 271 and 272 by way of respective pins 301 extending through axial bores D, rod members 261 extending in spaced apart relationship with rib segment 221 to effectively form therewith part of a fourbar linkage which further includes the plates of the hinge joints at the opposite ends of rib segment 221. A pair of rod members 262 is rotatably coupled to pins 307 extending through axial bores C, rod members 262 extending in spaced-apart relationship with rib segment 222 to effectively form therewith part of a fourbar linkage which further includes the plates of the hinge joints at the opposite ends of rib segment 222.

As pointed out above, the condition of the hinge joint depicted in FIGS. 12-14 corresponds to the stable, fully deployed condition of rib segments 221 and 222. When folded away from their fully deployed condition shown in FIGS. 12-14 rib segments 221 and 222 rotate in opposite directions (clockwise and counterclockwise, respectively, as denoted by arrows AA and AB in FIGS. 12) about axial bores A and B in plate 271 and 272. Rotation arrows AD, AC, AK, AJ, and AL show the direction of rotation and translation of the other components of the hinge joint 105 in the course of stowage from its fully deployed condition. As noted previously, pin 304 travels in slot 295 so that connection link 281 rotates in a clockwise direction, while link 282 rotates in a counterclockwise direction as pin 304 travels down the slot, as viewed in FIG. 12.

Figure 15:
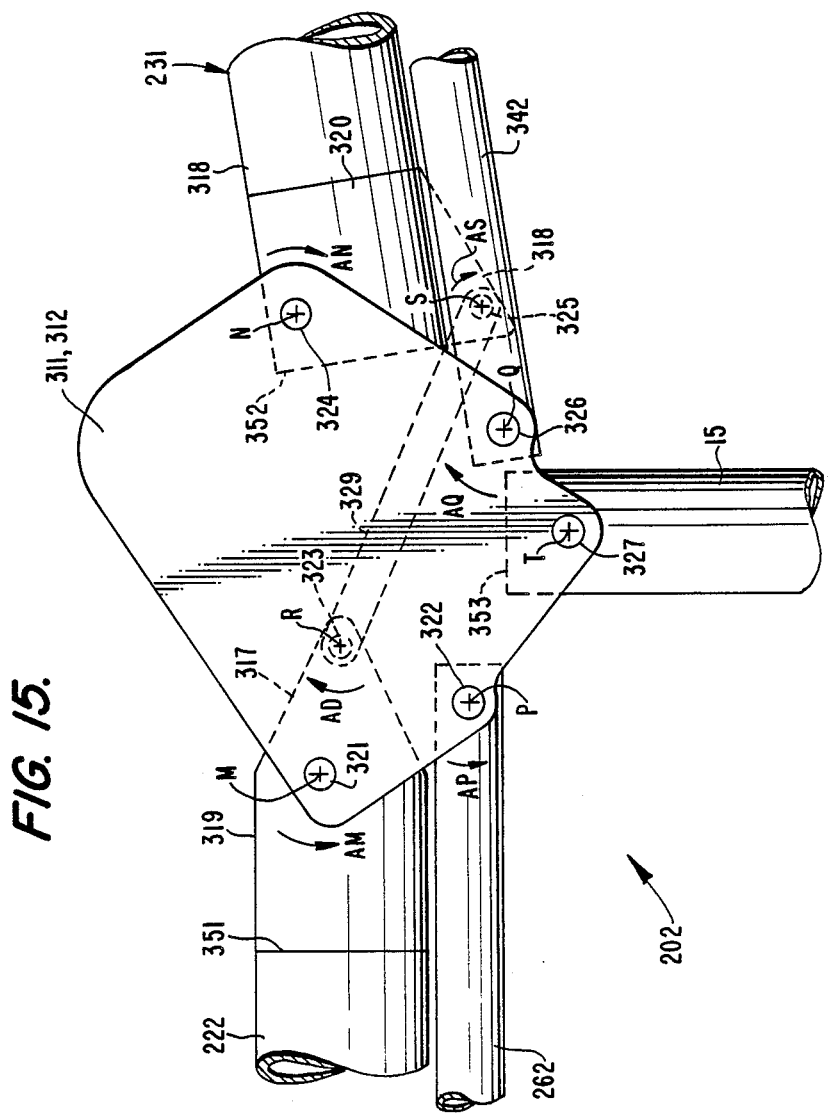
FIGS. 15-17 are respective side, end and top views diagrammatically illustrating the configuration of a rib/strut hinge joint of the rib-truss section shown in FIG. 11.
Figure 17:
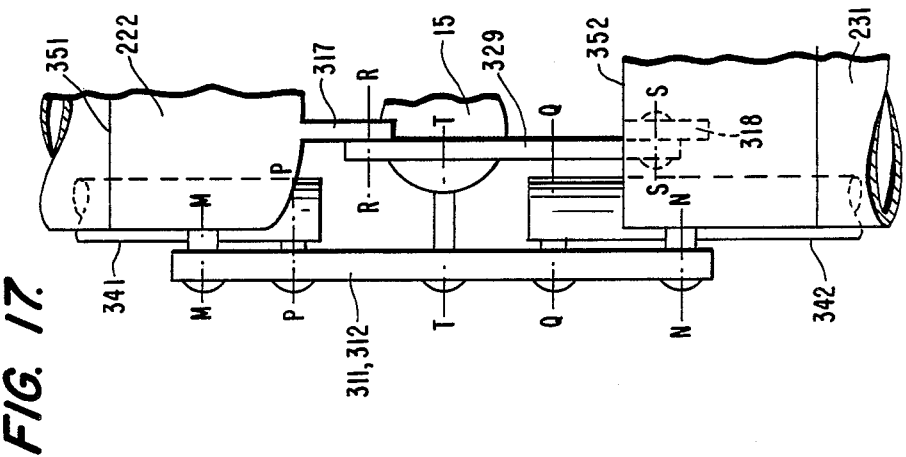
Figure 16:
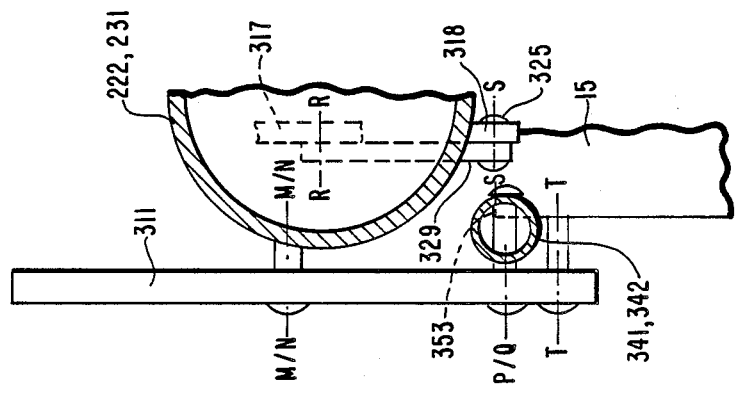

FIGS. 15-17 depict respective side, end and top views of the structural configuration of an individual rib segment-to-strut hinge joint, specifically hinge joint 204 which interconnects tubular rib segments 222 and 231 of the structural arrangement shown in FIG. 11, described above. Like the hinge joint shown in FIGS. 12-14, the rib segment-to-strut hinge joint is formed of a pair of symmetrical halves; accordingly, only one half of the joint has been shown in the Figures in order to simplify the drawings.

As shown therein each hinge joint is comprised of a pair of spaced apart plates 311, 312 which are separated by a distance sufficient to accommodate the diameters of tubular rib segments 222 and 231, and a connecting link 329 which extends between respective flanges 317 and 318 of a pair of sleeves 319 and 320 that are fitted on adjacent ends of rib segments 222 and 231. One end of link 329 is rotatably coupled to flange 317 by way of a pin 323 which extends through an axial bore R in link 329 and in flange 317 of sleeve 319 on the end of tubular rib segment 222. (As was the case with illustration in FIGS. 12-14 pin 323 and the remaining pins and associated axial bores through which the pins pass are shown as axial lines in order to simplify the drawings ) The other end of link 329 is rotatably coupled to flange 318 by way of a pin 325 which extends through an axial bore S in flange 318 and link 329. Each of plates 311 and 312 is rotatably coupled to tubular rib segments 222 and 231, respectively, via pins 321 and 324 which extend through axial bores M and N in sleeves 319 and 320 of respective rib segments 222 and 231. The plates are rotatably joined to strut 15 by way of pin 327 which extends through axial bore T in the plates and the strut, as shown.

The rib segment-to-strut hinge further includes respective rotatable connections to respective pairs of rod members 262 and 342 that extend in spaced-apart relationship with rib segments 222 and 231, to effectively form therewith part of a pair of fourbar linkages which include the plates of the hinge joints at the opposite ends of rib segments 222 and 231. Each of rod members 262 is rotatably coupled to plates 311, 312 by way of pins 322 extending through axial bores P, while each of rod members 342 is rotatably coupled to plates 311, 312 by way of pins 326 extending through axial bores Q in the plates and rod members, as shown.

The detailed configuration of the rib segment-to-strut hinge joint of FIGS. 15-17 represents its condition for the stable, fully deployed state of the support structure, as illustrated in FIG. 11, described above. When folded away from the state shown in FIGS. 15-17, rib segments 222 and 231 rotate in opposite counterclockwise and clockwise directions, respectively, about axial bores M and N, as denoted by arrows AM and AN in FIG. 15. Rotation arrows AP, AQ, AR and AS show the direction of rotation of the other components joint 204 in the course of stowage from its fully deployed state.

FIGS. 18 and 19 diagrammatically illustrate respective partially deployed and stowed states of serially interconnected rib segments 221 . . . 242 and struts 15 relative to central hub 14 of the truss support structure shown in FIG. 11 (absent the rod members of the fourbar linkages in order to simplify the drawing) As will be appreciated from the above description of FIGS. 12-17 and the deployment/stowage sequence shown in FIGS. 18 and 19, the truss support structure upon which the multipanel gores of the solar concentrator are mounted is capable of being stowed in a volumetrically compact condition thereby facilitating its transport from launch site to a spaced deployed location. Preferably, the hub-hinged ends of the fourbar linkages of the respective ribs of the truss structure (Not shown in FIGS. 18 and 19) are coupled to a controllable drive mechanism (engaged through hub 14), so as to enable the entire truss support structure and solar concentrator panels mounted thereon to be deployed about hub 14 to the condition shown in FIG. 3. In addition, because of the foldability of the individual panels of the concentrator between the edge strips of each gore the panels themselves can be compactly contained within the stowed configuration of the truss support structure.

Figure 20:
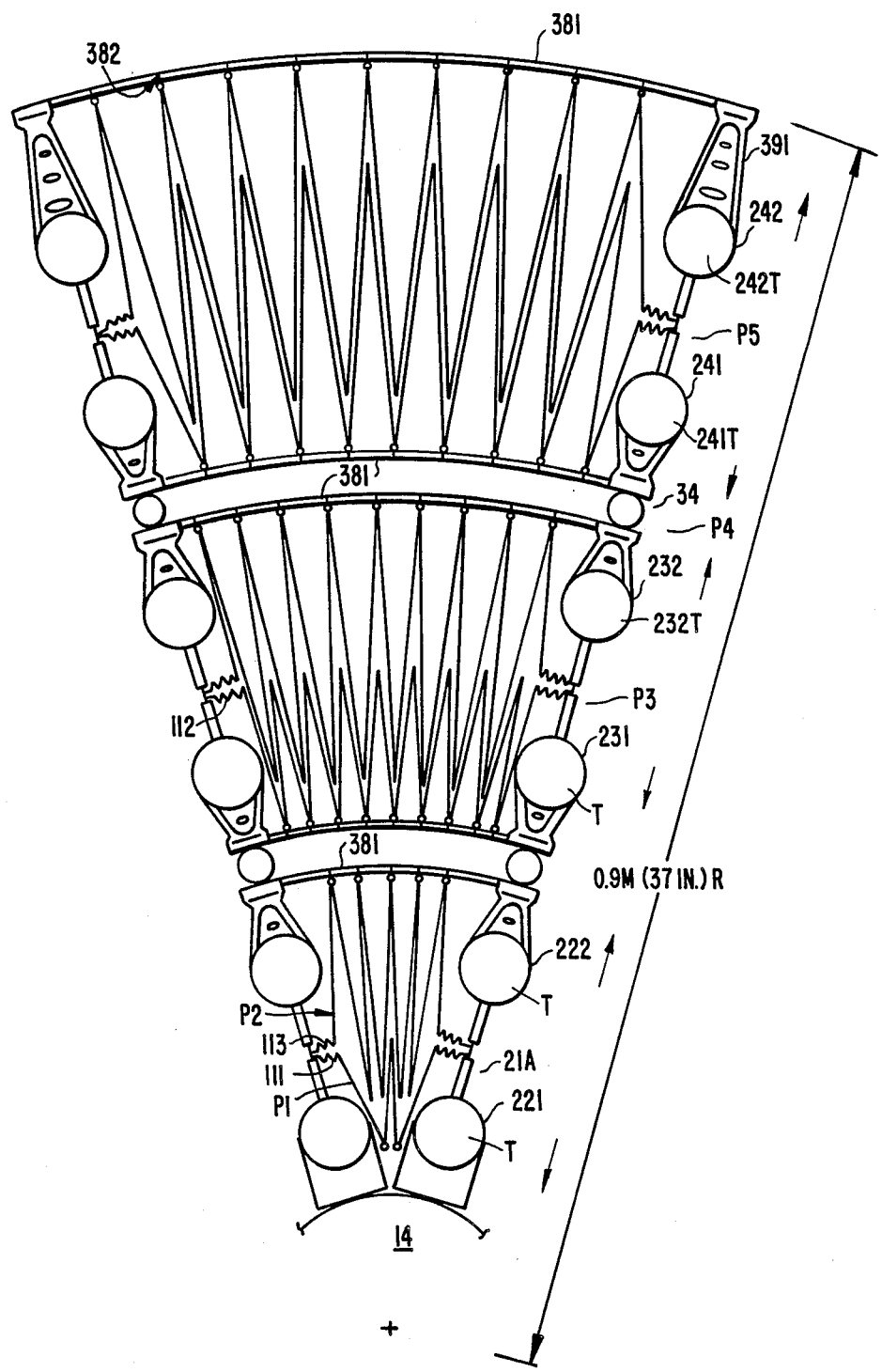
FIG. 20 diagrammatically illustrates the manner in which the dome structure of the present invention and its attendant deployable truss support fold together in their stowed configuration.

More particularly, as shown in FIG. 20, the respective pane segments of a gore are foldable and interleave with one another in a zig-zag (accordian-like) manner between a respective stowed pair of edge strips, such as edge strips 21A and 21B shown in FIG. 4. The respective segments of which the edge strips are comprised are shown in FIG. 20 as being arranged adjacent to the respective rib segments of the truss support structure and grouped in sets or pairs so as to provide for the interleaving of pairs of panel sections between circumferentially telescoping tapered hollow skewers 381 (comprised of interfitting sections) that are guided by standoffs 391 which are mounted to the rib segments, as shown in FIGS. 20 and 21. For this purpose, rings 382 are attached to fold line positions on the back faces of the panels, as shown in FIG. 21, so that the rings 382 (and consequently the panels 2) may slide with respect to and be guided by the skewers 381 to properly locate the panel surfaces in their stowed condition and provide for controlled releases of the panels during deployment of the solar concentrator structure. As the structure deploys, telescoping skewers 381 are decoupled from one another allowing rings 382 to drop off and release the dome panel structure in a controlled manner (similar to the sliding of a shower curtain off its support rod). As shown in FIG. 20, the overall lengths of skewers 382 are of successively decreasing circumferential lengths in the inward radial direction of a respective panel section or gore.

As will be appreciated from the foregoing description, the present invention provides an improved energy directing mechanism that allows a compound curve structure to be approximated by a compactly stowable arrangement of flat panels which, when deployed, are supported in a manner that eliminates the need for front cords and thereby enhances the energy transfer efficiency of the reflector. With the curvilinear configuration being approximated by the flat panels which require tension only in the circumferential direction (radial tension being created by the outer perimeter anchoring of the radial ribs and the use of gore to gore spring tie elements, contour equilibration is considerably simplified. In addition, because adjacent panels are interconnected by flexible U-shaped hinges which engage radially extending load distribution bars that are slideable within the hinges, the structure is capable of accommodating changes in surface boundaries with changes in temperature.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a support framework containing a plurality of spaced apart rib members radially extendable to encompass a contoured surface, a structure for supporting a multiplicity of energy directing elements in the shape of said contoured surface comprising:
   a plurality of radially extending edge strips respectively disposed in parallel, spaced-apart relationship with respect to said rib members;
   a plurality of first connection elements connecting each edge strip to a respective rib member at a plurality of spaced apart locations distributed therealong; and
   a plurality of panel sections, each respective panel section being supported between a respective pair of radially extending edge strips and including
      a plurality of panel strips adjacent to one another in the radial direction in the space between said respective pair of edge strips, said panel strips having opposite sides thereof extending in the radial direction parallel to and being coupled to said pair of edge strips, and
      tensioning means, coupled to at least one location on each respective panel strip, spaced apart from the opposite sides thereof, for placing said respective panel strips in tension between said at least one location and said respective pair of edge strips.

2. A structure according to claim 1, wherein said tensioning means comprises means, coupled to a plurality of spaced apart locations on each respective panel strip and spaced apart from the opposite sides thereof, for placing said respective panel strip in tension between said plurality of spaced apart locations and said respective pair of edge strips.

3. A structure according to claim 1, wherein each panel strip of each respective panel section is foldable along at least one line effectively parallel to the opposite sides thereof, said line lying within the respective panel strip whereto said tensioning means is coupled.

4. A structure according to claim 1, wherein each panel strip of a respective panel section has at least one load distribution element coupled to at least one location thereon and wherein said tensioning means is coupled to said at least one load distribution element.

5. A structure according to claim 4, wherein a respective load distribution element comprises a bar member coupled to a panel strip along a line thereon effectively parallel to the opposite sides of said panel strip.

6. A structure according to claim 5, wherein a respective panel strip is foldable along at least one line effectively parallel to the opposite sides thereof and includes at least one line whereto the load distribution bar member is coupled.

7. A structure according to claim 6, wherein at least one line along which said panel strip is foldable includes at least one line in addition to the at least one line whereto at least one respective load distribution bar member is coupled.

8. A structure according to claim 1, wherein said tensioning means comprises at least one cylindrical member extending in a direction effectively parallel to the opposite sides of a panel strip, means for coupling said cylindrical member to said panel strip, and means, coupled to spaced apart locations of said at least one cylindrical member, for urging said at least one cylindrical member in a direction away from said panel strip.

9. A structure according to claim 8, wherein said urging means comprises means for urging said at least one cylindrical member toward each of a pair of rib members to which said pair of edge strips are connected.

10. A structure according to claim 8, wherein said means for coupling said at least one cylindrical member to said panel strip comprises, for each respective cylindrical member, a flexible hinge affixed to spaced-apart locations of one surface of said panel strip so as to form a loop of U-shaped cross-section extending away from said one surface of said panel strip, said respective cylindrical member passing through said loop so as to be engaged by said flexible hinge.

11. A structure according to claim 10, wherein the spaced-apart locations of said one surface of said panel strip are separated by a distance corresponding substantially to the diameter of said cylindrical member.

12. A structure according to claim 11, wherein the cross-sectional perimeter of said hinge between the spaced-apart locations of said one surface of said panel strip corresponds substantially to the circumference of a circular cross-section of said cylindrical member.

13. A structure according to claim 10, wherein said panel strip is foldable along a line between the spaced apart locations of said one surface of said panel, said line extending in a direction effectively parallel to opposite sides of said panel strip.

14. A structure according to claim 13, wherein said hinge comprises a longitudinally extending flexible band affixed to said one surface of said panel along first and second spaced apart lines disposed effectively parallel to the opposite sides of said panel strip between which a line along which said panel strip is foldable is located.

15. An apparatus according to claim 14, wherein said cylindrical member urging means comprises, for a respective cylindrical member, means, coupled to opposite ends of said cylindrical member, for urging said cylindrical member in a direction away from said panel strip and thereby placing said longitudinally extending flexible hinge and said panel strip, affixed thereto, in tension.

16. A structure according to claim 1, wherein said tensioning means comprises, for each respective panel strip, a plurality of cylindrical members extending in a direction effectively parallel to the opposite sides of the respective panel strip, means for coupling said plurality of cylindrical members to said panel strip, and means, coupled to spaced apart locations of each of said cylindrical members, for urging said cylindrical members in a direction away from said panel strip.

17. A structure according to claim 16 wherein said means for coupling said cylindrical members to said panel strip comprises, for a respective cylindrical member, a flexible hinge affixed to spaced-apart locations of one surface of said panel strip, so as to form a loop of U-shaped cross-section extending away from said one surface of said panel strip, said respective cylindrical member being coupled to said loop so as to be connected thereby to said panel strip.

18. A structure according to claim 17, wherein the spaced-apart locations of said one surface of said panel are separated by a distance corresponding substantially to the diameter of said cylindrical member.

19. A structure according to claim 18, wherein the cross-sectional perimeter of said hinge between the spaced-apart locations of said one surface of said panel strip corresponds substantially to the circumference of a circular cross-section of said cylindrical member.

20. A structure according to claim 17, wherein said panel strip is foldable along a line between the spaced apart locations of said one surface of said panel strip, said line extending in a direction effectively parallel to opposite sides of said panel strip.

21. A structure according to claim 20, wherein said hinge comprises a longitudinally extending flexible band affixed to said one surface of said panel strip along first and second spaced apart lines disposed effectively parallel to opposite sides of said panel strip between which a line along which said panel is foldable is located.

22. A structure according to claim 21, wherein said cylindrical member urging means comprises, for a respective cylindrical member, means, coupled to opposite ends of said cylindrical member, for urging said cylindrical member in a direction away from said panel strip and thereby placing said longitudinally extending flexible band and said panel strip, affixed thereto, in tension.

23. A structure according to claim 17, wherein each panel section includes means, coupled between respective opposite sides of each respective panel strip and said pair of edge strips, for supporting and urging the respective opposite sides of said respective panel strip toward said pair of edge strips.

24. A structure according to claim 23, wherein said supporting urging means comprises a plurality of connection elements engaging respective locations along opposite sides of said panel strip and being connected in tension to a plurality of locations distributed along said pair of edge strips.

25. A structure according to claim 1, wherein a respective panel strip comprises a plurality of substantially flat and rigid panels arranged side-by-side means for interconnecting edge portions of adjacent panels, and means for coupling edge portions of panels, adjacent to said pair of edge strips, to said edge strips.

26. A structure according to claim 25, wherein a respective panel is foldable along a line spaced apart from and parallel to opposite edge portions thereof.

27. A structure according to claim 25, wherein said tensioning means comprises, for a respective panel strip, a plurality of cylindrical members each extending in a direction effectively parallel to opposite sides of a respective panel, each respective cylindrical member being coupled to a respective means for interconnecting edge portions of a pair of adjacent panels, and means, coupled to spaced apart locations of a cylindrical member, for urging said respective cylindrical member in a direction away from said panel strip.

28. A structure according to claim 27, wherein respective edge portion interconnecting means comprises a flexible hinge affixed to respective spaced apart locations of edge portions of adjacent panels so as to form a loop of U-shaped cross-section extending away from said panels, said respective cylindrical member passing through said loop so as to be engaged by said flexible hinge.

29. A structure according to claim 28, wherein the spaced-apart locations of edge portions of adjacent panels are separated by a distance corresponding substantially to the diameter of said cylindrical member.

30. A structure according to claim 29, wherein the cross-sectional perimeter of said hinge between the spaced-apart locations of edge portions of adjacent panels correspond substantially to the circumference of a circular cross-section of said cylindrical member.

31. A structure according to claim 28, wherein said cylindrical member is slidable within the U-shaped cross-section of said flexible hinge.

32. A structure according to claim 31, wherein said flexible hinge is made of a material having thermal expansion properties which are compatible with those of said panels.

33. A structure according to claim 3, wherein adjacent panel strips that are included in a respective panel section are arranged to be folded together in an interleaved manner along the respective fold lines of the panels of which said adjacent panel strips are comprised.

34. A structure according to claim 33, wherein each edge strip of a respective pair of edge strips is formed of a plurality of edge strip segments and connecting tension transferring tie members coupled therebetween so as to be foldable at separations between edge strip segments, and arranged to accommodate the folding and stowage of adjacent panel strips of a respective panel.

35. A structure according to claim 34, wherein each foldable panel has a ring affixed thereto along a fold line thereof and wherein a respective panel section has respective skewers arranged to be coupled with the rings of said foldable panels so as to maintain said panels in the interleaved condition.

36. A hinge assembly for flexibly joining first and second substantially flat panels to one another and enabling said panels to be stowed in an overlapping condition comprising:

a flexible band formed of a base portion first and second regions of which are affixed to space-apart surface portions adjacent to opposing separated edges of said first and second substantially flat panels, and a substantially U-shaped portion, formed of a pair of leg portions and a generally semicircular curved portion, said pair of leg portions extending from and being contiguous with spaced-apart ends of said base portion to ends of said semiconductor portion;

a generally cylindrical hollow sleeve affixed to an interior surface of the semicircular portion of said generally U-shaped portion of said flexible band, the outer diameter of said sleeve effectively corresponding to the separation between the spaced apart ends of said base portion, and wherein the perimeter of the U-shaped portion of said flexible band effectively corresponds to the circumference of said sleeve; and a generally cylindrical bar element slidable within said sleeve.

37. A hinge assembly according to claim 36, wherein the thermal expansion characteristics of the material of said band are compatible with those of said first and second substantially flat panels.

38. A hinge assembly according to claim 37, wherein said band and said first and second substantially flat panels are made of the same material.

* * * * *